US010321221B1

(12) United States Patent
Quezada

(10) Patent No.: US 10,321,221 B1
(45) Date of Patent: Jun. 11, 2019

(54) AVIATION INTERCOMMUNICATION SYSTEM TO MOBILE COMPUTING DEVICE INTERFACE

(71) Applicant: The MITRE Corporation, McLean, VA (US)

(72) Inventor: Marco Quezada, Silver Spring, MD (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/978,818

(22) Filed: May 14, 2018

(51) Int. Cl.
*H04R 5/00* (2006.01)
*H04M 11/08* (2006.01)
*H04R 1/10* (2006.01)
*G08G 5/00* (2006.01)

(52) U.S. Cl.
CPC ......... *H04R 1/1083* (2013.01); *G08G 5/0021* (2013.01); *H04R 1/1041* (2013.01)

(58) Field of Classification Search
CPC . H04R 29/00; H04R 1/08; H04R 1/10; H04R 1/1041; H04R 5/00; H04R 5/033; H04R 5/04; H04B 1/00; H04M 11/08
See application file for complete search history.

(56) References Cited

U.S. PATENT DOCUMENTS 6,493,450 B1 12/2002 Scheuer et al.
6,873,872 B2 * 3/2005 Gluckman ......... A61N 1/36014 128/898
6,963,743 B1 11/2005 James
7,366,577 B2 4/2008 DiSanza et al.
7,907,721 B1 3/2011 Wurtz
8,199,956 B2 6/2012 Haartsen et al.
8,750,534 B2 6/2014 Yamkovoy et al.
8,944,822 B2 2/2015 Gelinske et al.
2003/0026440 A1 * 2/2003 Lazzeroni .............. H04B 1/207 381/86
2006/0022845 A1 2/2006 Fischer
2006/0046656 A1 3/2006 Yang
(Continued)

OTHER PUBLICATIONS

Anonymous (2000) "Mobile phones can interfere with aircraft equipment according to new tests," located at https://dialog.proquest.com/professional/printviewfile?accountid=142257, visited on Sep. 26, 2017; 3 pages.
(Continued)

*Primary Examiner* — Blane J Jackson
(74) *Attorney, Agent, or Firm* — Morrison & Foerster LLP

(57) ABSTRACT

An interface device configured to coordinate signals between an aviation intercommunication system and a mobile computing device is provided. In one or more example, the interface device can be configured to minimize noise that can interfere with the communications between the pilot of the aircraft and the mobile computing device while also ensuring that the mobile computing device does not interfere with air traffic control radio signals. The interface device can include a microcontroller that can coordinate various signals inputted into and outputted out of the interface device such that a mobile computing device can receive a pilot's commands and can transmit notifications to the pilot without interfering with the pilot's ability to understand communications coming from air traffic controllers.

26 Claims, 8 Drawing Sheets

(56) References Cited

U.S. PATENT DOCUMENTS

| | | | | |
|---|---|---|---|---|
| 2007/0088467 | A1 | 4/2007 | Knotts | |
| 2007/0150124 | A1 | 6/2007 | Wipplinger et al. | |
| 2007/0168122 | A1 | 7/2007 | Aspen | |
| 2007/0200731 | A1 | 8/2007 | Winkler et al. | |
| 2007/0222643 | A1 | 9/2007 | Winkler | |
| 2007/0299611 | A1 | 12/2007 | Winkler et al. | |
| 2010/0030400 | A1 | 2/2010 | Komer et al. | |
| 2010/0161160 | A1 | 6/2010 | Wilson et al. | |
| 2011/0124381 | A1* | 5/2011 | Wurtz ................. | H04M 1/6058 455/570 |
| 2012/0140933 | A1* | 6/2012 | Sherwood .............. | H04R 27/00 381/56 |
| 2016/0093223 | A1 | 3/2016 | Caudron et al. | |
| 2018/0075757 | A1 | 3/2018 | Estes et al. | |

OTHER PUBLICATIONS

Burian, Barbara K. et al. (2007) "Alone at 41,000 Feet," Flight Safety Foundation, Aerosafetyworld, located at http://human-factors.arc.nasa.gov/ihs/flightcognition/Publications/asw_nov07_p30-34.pdf; 5 pages.

George, Fred, (2007) "The Virtual Copilot and the VLJ," Business & Commercial Aviation, vol. 100, Issue 6; 7 pages.

Anonymous (2010) "New Bose[R] A20[TM] Aviation Headset," located at https://dialog.proquest.com/professional/printviewfile?accountid=142257, visited on Sep. 26, 2017; 3 pages.

Allen, B. Danette et al., (2015) "Who's got the bridge?—Towards Safe, Robust Autonomous Operations at NASA Langley's Autonomy Incubator," American Institute of Aeronautics and Astronautics; 8 pages.

Giangreco, Leigh, (2015) "DARPA completes flight tests for subsystems on automated cockpit," Inside Defense, Inside the Air Force; 1 page.

Wasserbly, Daniel (2016) "Xponential 2016: US Army eyes DARPA's cockpit automation project," located at http://www.janes.com/article/60028/xponential-2016-us-army-eyes-darpa-s-cockpit-automation-project?from_rss=1; 2 pages.

US Department of Transportation Federal Aviation Administration (2017) "Aeronautical Information Manual (AIM)," Official Guide to Basic Flight Information and ATC Procedures; 732 pages.

* cited by examiner

AVIATION INTERCOMMUNICATION SYSTEM TO MOBILE COMPUTING DEVICE INTERFACE

FIELD OF THE DISCLOSURE

This disclosure relates to an aviation intercommunication system to mobile computing device interface. The interface can facilitate communication between a pilot of an aircraft and a mobile computing device by mitigating the effects of ambient noise in the cockpit and ensure that communications between the pilot and the mobile device do not interfere with air traffic control communications. In one or more examples, the interface can also include a signaling mechanism that allows the interface to communicate with the mobile computing device.

BACKGROUND OF THE DISCLOSURE

General aviation ("GA") is civil aviation operations other than scheduled air services and non-scheduled air transport operations for compensation or hire. Although commercial aviation has been touted as one of the safest ways to travel, general aviation flight does not enjoy a similar safety record. In addition, single-pilot general aviation operations are higher risk than dual-pilot general aviation operations.

This variation in the accident rate between a single-pilot aviation flight and a dual-pilot aviation flight can at least be partially attributed to the increased cognitive load single-pilots endure when a co-pilot is not present with them in the cockpit. Pilots who are controlling aircraft by themselves often time have to perform multiple tasks simultaneously and are unable to delegate any of those tasks to another pilot which can lead to a greater chance for human error.

New low-cost technologies that enhance pilot safety and situational awareness, especially in single pilot scenarios, are becoming more prevalent. As an example, computers or computing devices loaded with software and interfaces that reduce pilot cognitive load can be employed by a pilot. In one or more examples, these technologies can be loaded onto a mobile computing device that can be used in-flight to aid the pilot by providing information that the pilot can use to better operate the aircraft. The mobile computing device can use audio signals to communicate with the pilot, not only by providing information to the pilot through voice but also by interpreting verbal commands spoken by a pilot.

However, the cockpit environment may cause interference with the operation of a mobile computing device as described above. Cockpits can often contain a significant amount of ambient noise caused by the engine of the plane and other sources. This ambient noise can often hinder communications between a pilot and a mobile computing device, which can lead to a decline in the usability of a mobile computing device to aid the pilot. Furthermore, the pilot must be able to both speak and listen to air traffic controllers during a flight, and any mobile computing device should not disturb or frustrate those communications; otherwise the risk of pilot error may increase.

SUMMARY OF THE DISCLOSURE

Accordingly, one or more aviation intercommunication system to mobile computing device interfaces are provided. In one or more examples, an electronic interface device can be configured to minimize noise that can interfere with the communications between the pilot of the aircraft and the mobile computing device while also ensuring that the mobile computing device does not interfere with air traffic control radio signals.

The electronic interface device can minimize any noise signals that may interfere with a pilot's ability to communicate with the mobile computing device by providing a dedicated microphone signal and can provide circuitry that ensures that the mobile computing device does not interfere with air traffic control communications with the pilot.

The systems and methods described above can be used by pilots to maximize the probability that their communications to the mobile computing device are understood, while at the same time ensuring that vital air traffic control radio traffic is not interrupted by transmissions from the mobile computing device.

DETAILED DESCRIPTION

Figure 1:
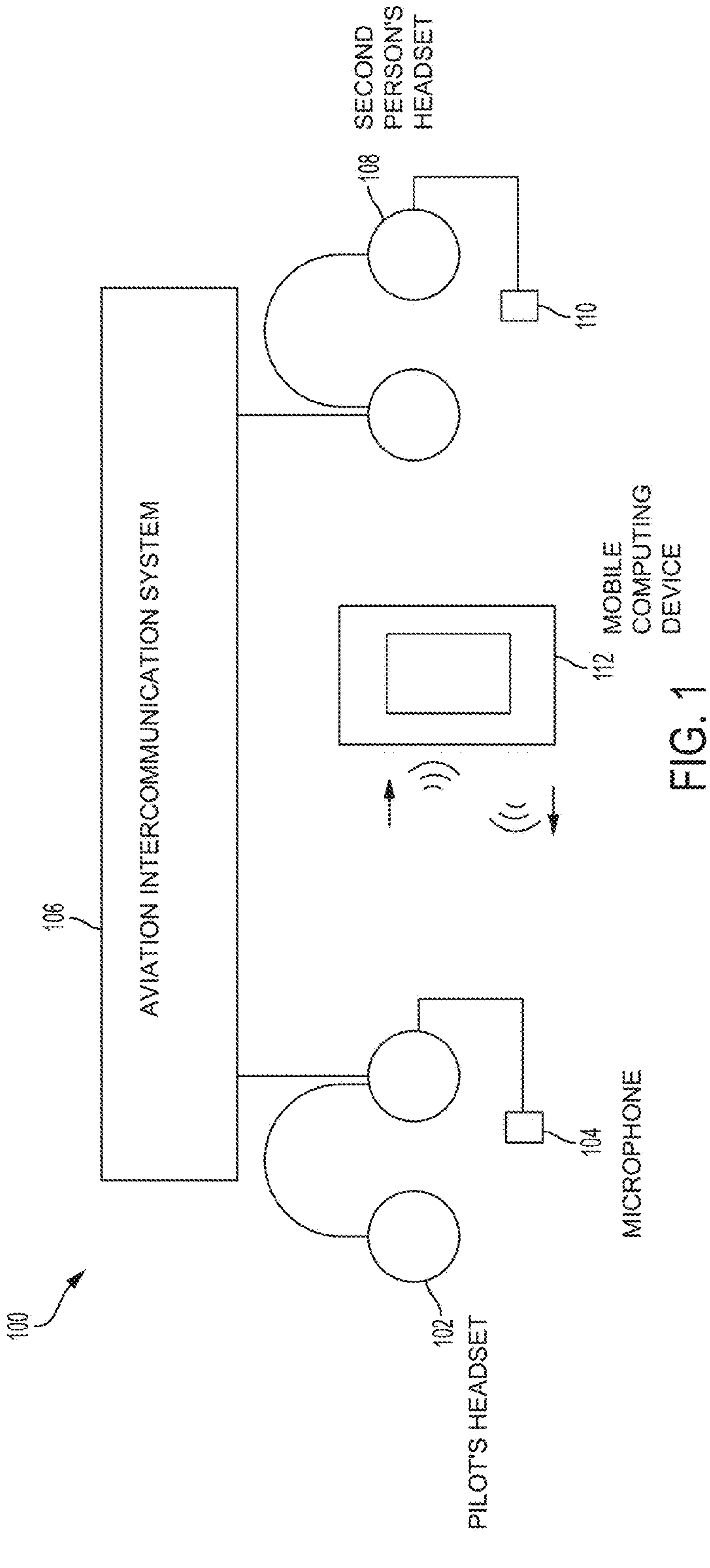
FIG. 1 illustrates an exemplary aircraft communication system configured with a mobile computing device according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for facilitating communications between a pilot of an airplane and a mobile computing device configured to reduce the cognitive load a pilot faces when piloting an aircraft. In one example, a separate electronic interface device can be connected between the mobile computing device and an aviation intercommunication system, and be configured to provide a dedicated microphone connection between the pilot and the mobile computing device while at the same time being configured to not allow the mobile computing device to transmit audio signals when air traffic control radio traffic is being received by the aircraft.

In an effort to reduce the cognitive load of pilots especially in single pilot flying scenarios, mobile computing devices have been employed in cockpits as a tool to aid the pilot in flying the aircraft by providing pertinent information that can aid the piloting of the aircraft. Mobile computing devices can help improve general aviation safety by reducing single-pilot workload and/or providing timely information to the pilot. Mobile computing devices can bring some of the benefits of Crew Resource Management (CRM) to the single-pilot cockpit. For example, the mobile computing device can offload some pilot workload related to searching for and/or retrieving information by automatically presenting relevant information to the pilot based on context. In another example, the mobile computing device can be configured to deliver relevant information to the pilot based on context by predicting phase of flight and/or anticipating the pilot's intentions. The mobile computing device can be configured to determine what phase of flight the aircraft is currently in, and when applicable, also the traffic pattern leg the aircraft is on.

In one more example, the mobile computing device can determine a phase of flight for the aircraft and in response to it, provide the pilot with at least one notification based on the phase of flight for the aircraft. Mobile computing devices can be employed and configured to receive a destination airport for an aircraft and determine whether visibility at the destination airport is below a threshold visibility. In response to determining that the visibility at the destination airport is below a threshold visibility, a mobile computing device can be configured to notify the pilot of the visibility at the destination airport and can further determine whether ceiling at the destination airport is below a threshold altitude. In response to a determination that the ceiling at the destination airport is below the threshold altitude, the mobile computing device can provide the pilot with at least one notification in accordance with the phase of flight for the aircraft. Other tasks that can be conducted by a mobile computing device, thereby reducing pilot cognitive load, can include determining what phase of the flight the aircraft is in (i.e., takeoff or landing), and determining remaining distance to runway end. The mobile computing device can provide notifications to the pilot such as a notification containing the appropriate radio frequency for weather information (for example, an Automated Terminal Information Service (ATIS) frequency).

An example of a mobile computing device configured to aid a pilot during operation of an aircraft can be found in U.S. patent application Ser. No. 15/706,282 entitled "Digital Copilot" which is hereby incorporated by reference in its entirety. To facilitate the above functions, and any other tasks that a mobile computing device can perform to the pilot's benefit, the mobile device can be configured to both receive voice commands from a pilot, as well as transmit audio notifications to the pilot. However, the communications between a mobile computing device and a pilot may be constrained because the noise environment of an aircraft's cockpit during operation of the aircraft may hinder the ability of the mobile computing device to understand the pilot's voice commands, and may further hinder the ability of the pilot to understand the audio transmissions being generated by the mobile computing device. Furthermore, the mobile computing device can hinder the communications between the pilot and air traffic control by providing audio notifications at the same time that air traffic controllers are trying to communicate with the pilot. To facilitate the pilot's communications with the mobile computing device and reduce the impact of noise in the cockpit, the mobile device can be connected to an aircraft's preexisting aviation intercommunication systems to provide an isolated microphone signal between the mobile computing device and the pilot.

FIG. 1 illustrates an exemplary aircraft communication system configured with a mobile computing device according to examples of the disclosure. In system 100 of the example of FIG. 1, the pilot of the aircraft can be outfitted with an audio headset 102 that, as described below, can facilitate the communications between the pilot and air traffic control, and in some examples can also facilitate communication between the pilot and a second passenger who can be outfitted with a second audio headset 108. The pilot's headset 102 can be connected to an aviation intercommunication system 106. Aviation intercommunication system 106 can be configured to allow a pilot wearing headset 102 to communicate with air traffic control via radio transmissions as well as communicate with a second person in the cockpit (i.e., a co-pilot or a passenger).

The pilot's headset 102 can include a microphone 104. The microphone 104 can pick up voice signals uttered by a pilot and electronically transmit them via the aviation intercommunication system 106 to either air traffic control via a radio or to the second person in the cockpit wearing headset 108. This system 100 can ensure that the noise associated with the cockpit during operation of the airplane does not interfere with a pilot's ability to understand either audio signals coming from air traffic control or a second passenger. The microphone 104 can be positioned by the mouth of the pilot to pick up their audio signals and transmit them directly to the intended recipient via a microphone signal all the while filtering out any ambient noise from the cockpit. In this way, the microphone 104 can pick up the pilot's audio while minimizing that amount of noise that is also transmitted.

The system 100 can also include a mobile computing device 112. In the example of FIG. 1, the mobile computing device 112 can be a free standing device insofar as it is not connected to aviation intercommunication system 106. The mobile computing device 112 may include voice recognition hardware and software that can be configured to recognize audio commands and execute them once it has been determine that such a command has been given. In one or more examples, the mobile computing device 112 can listen to the pilot's verbal commands, recognize what the command is asking for, and to perform certain tasks or provide information in response to the recognized command.

Mobile computing device 112 can also provide information to the pilot using audio. As an example, rather than or in addition to displaying information on a screen, the mobile computing device 112 can convey the information using audio that can be broadcast from a speaker located internally or externally to the mobile computing device.

Thus, the ability for the pilot's audio commands to be understood by the mobile device, as well as the pilot's ability to understand the mobile computing device's audio broadcasts 112 can be of importance. However, in the system 100, the audio transmitted and received by the mobile computing device may experience more interference from the ambient noise of the cockpit since it does not use a dedicated microphone system (and thus does not isolate the pilots voice) like the one provided by aviation intercommunication system 106. Thus, the mobile computing device 112 may have difficulty discerning the pilot's commands because the noise may effectively drown out the pilot's audio commands. Furthermore, the pilot may have difficulty understanding the audio output of the mobile computing device 112 because the ambient noise of the cockpit may be mixed in with the audio output so that a pilot may not understand what is being transmitted. Additionally, because the pilot is wearing a headset that covers his/her ears, and is listening to communications from air traffic control as well as other occupants of the aircraft, the probability of a pilot misunderstanding what is being transmitted by the mobile computing device 112 may be greatly increased.

Figure 2:
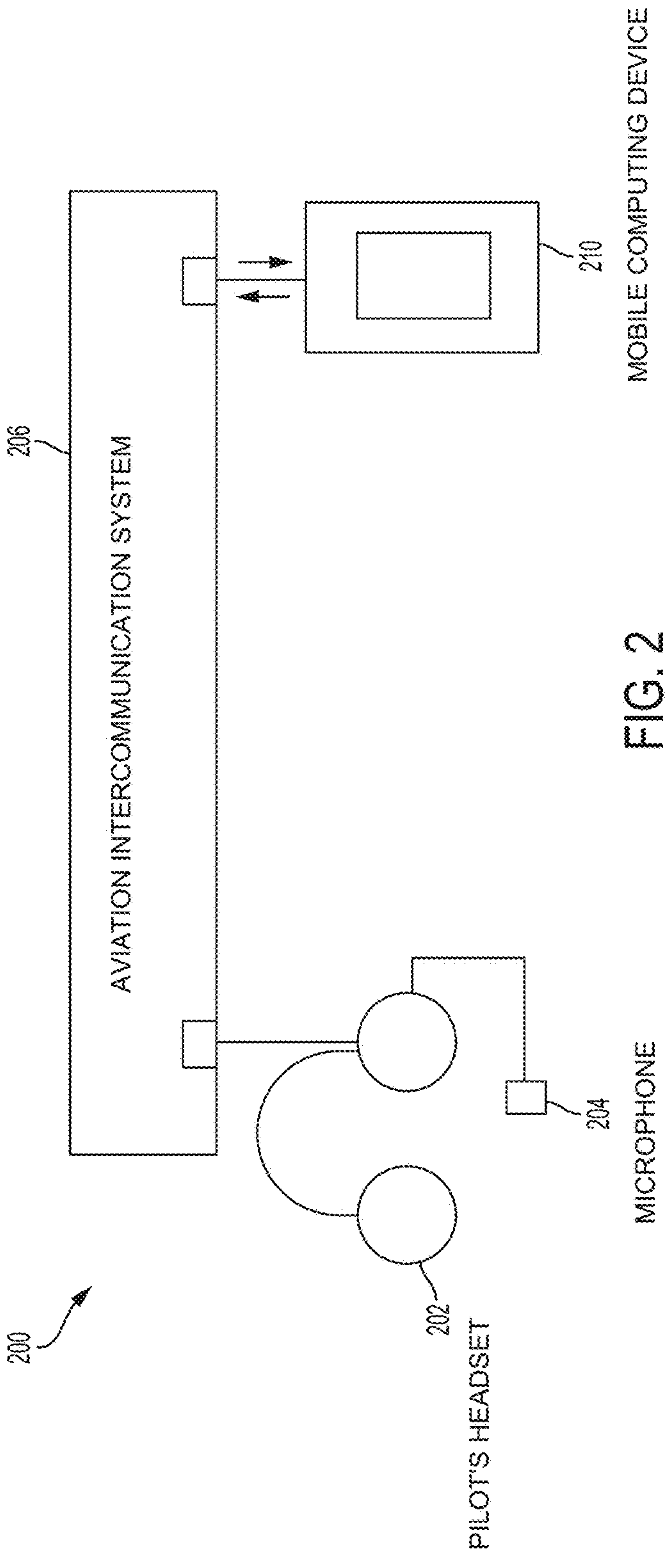
FIG. 2 illustrates another exemplary aircraft configured with a mobile computing device according to examples of the disclosure.

FIG. 2 illustrates another exemplary aircraft configured with a mobile computing device according to examples of the disclosure. In the example of FIG. 2, the system 200 may be configured such that the mobile computing device 210 can be connected to the aviation intercommunication system 206 such that the audio transmissions between the pilot and the mobile computing device can be better understood in the noisy environment of an airplane cockpit.

In the example of FIG. 2, since the mobile computing device 210 can be connected to the aviation intercommunication system 206, the mobile computing device can utilize the microphone signal connection that is established between the pilot's headset 202 and the aviation intercommunication system. In this way, instead of picking up both the pilot's audio commands and the ambient noise of the cockpit, the pilot's audio commands can be isolated from the noise via the aviation intercommunication system to allow the mobile computing device 210 to have a higher probability of understanding the pilot's commands since the microphone of the headset 204 directly receives the pilot's audio commands while filtering the bulk of the noise in the cockpit. Likewise, since the pilot can now receive audio transmissions from the mobile computing device 210 via their headset 202, the pilot can have an increased probability of understanding the audio transmitted by the mobile computing device.

The example of FIG. 2, in which the mobile computing device 210 is connected directly into the aviation intercommunication system 206, can engender a new issue with respect to the pilot's ability to understand air traffic control. During operation of a flight, the pilot can use headset 202 with microphone 204 to communicate back and forth with air traffic control via radio. The pilot's audio can be transmitted to air traffic controllers on the ground via a radio that is connected to aviation intercommunication system 206. Audio signals from air traffic controllers on the ground can also be heard by the pilot using radio signals that are received and transmitted to the pilots via the aviation intercommunication system 206.

However, if mobile computing device 210 is also connected to the aviation intercommunication system 206, as in the example of FIG. 2, and is broadcasting audio to the pilot, there is a substantial chance that the mobile computing device may inadvertently "step on the frequency." Stepping on the frequency can refer to a situation in which the mobile computing device attempts to transmit audio to the pilot at the same time as air traffic control is attempting to transmit audio commands to the pilot. In such a scenario, the pilot may become confused because the pilot may neither be able to understand what air traffic control is saying nor understand what the mobile computing device is saying. Such a situation can present a safety issue for the aircraft because information and commands conveyed by air traffic control can be critical to ensuring that the aircraft operates safely.

The example of FIG. 2, while helping to make the audio transmissions of the mobile computing device 210 understandable by removing unwanted ambient noise, can still create a safety issue for the aircraft by increasing the chance that commands from air traffic control are misunderstood. However, instead of directly connecting a mobile computing device to an aviation intercommunication system, such as in the example of FIG. 2, a separate device can be connected between the audio output of the mobile computing device and the input on the aviation intercommunication system, that can isolate out ambient noise while at the same time ensuring that the audio transmitted by the mobile computing device does not interfere with air traffic control communications.

Figure 3:
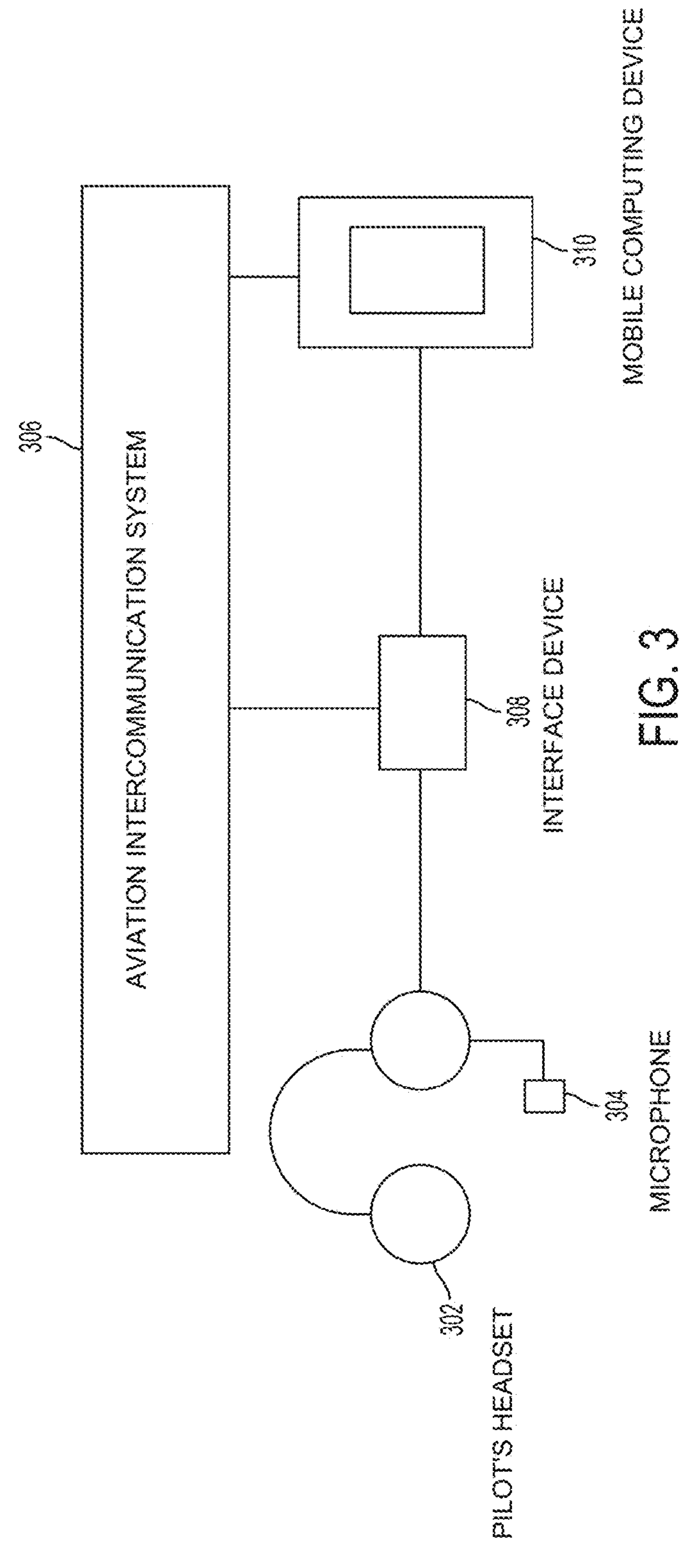
FIG. 3 illustrates exemplary aircraft configured with a mobile computing device and an aviation intercommunication system to mobile computing device interface according to examples of the disclosure.

FIG. 3 illustrates exemplary aircraft configured with a mobile computing device and an aviation intercommunication system to mobile computing device interface according to examples of the disclosure. In the example of FIG. 3, instead of connecting the mobile computing device 310 directly to the aviation intercommunication system 306, an interface device 308 can be placed in between the mobile computing device and the aviation intercommunication system 306. The interface device 308 can be configured to receive audio from the pilot via a microphone 304 on the pilot's headset 302, and transmit the audio to the mobile computing device 310. The interface device 308 can also be configured to receive audio from the mobile computing device 310 and transmit the audio to the pilot's headset 302. The interface device 308 can be further configured to receive radio transmissions from air traffic controllers via the aviation intercommunication system 306.

The interface device 308 can perform various functions, including providing a noise-isolated audio connection between a pilot's microphone 304 and the mobile computing device 310. In one or more examples, the interface device can also be configured to minimize or prevent audio communications from the mobile computing device 310 when air traffic control is providing audio communications to the aircraft and when the pilot of the aircraft is communicating with air traffic control.

Figure 4:
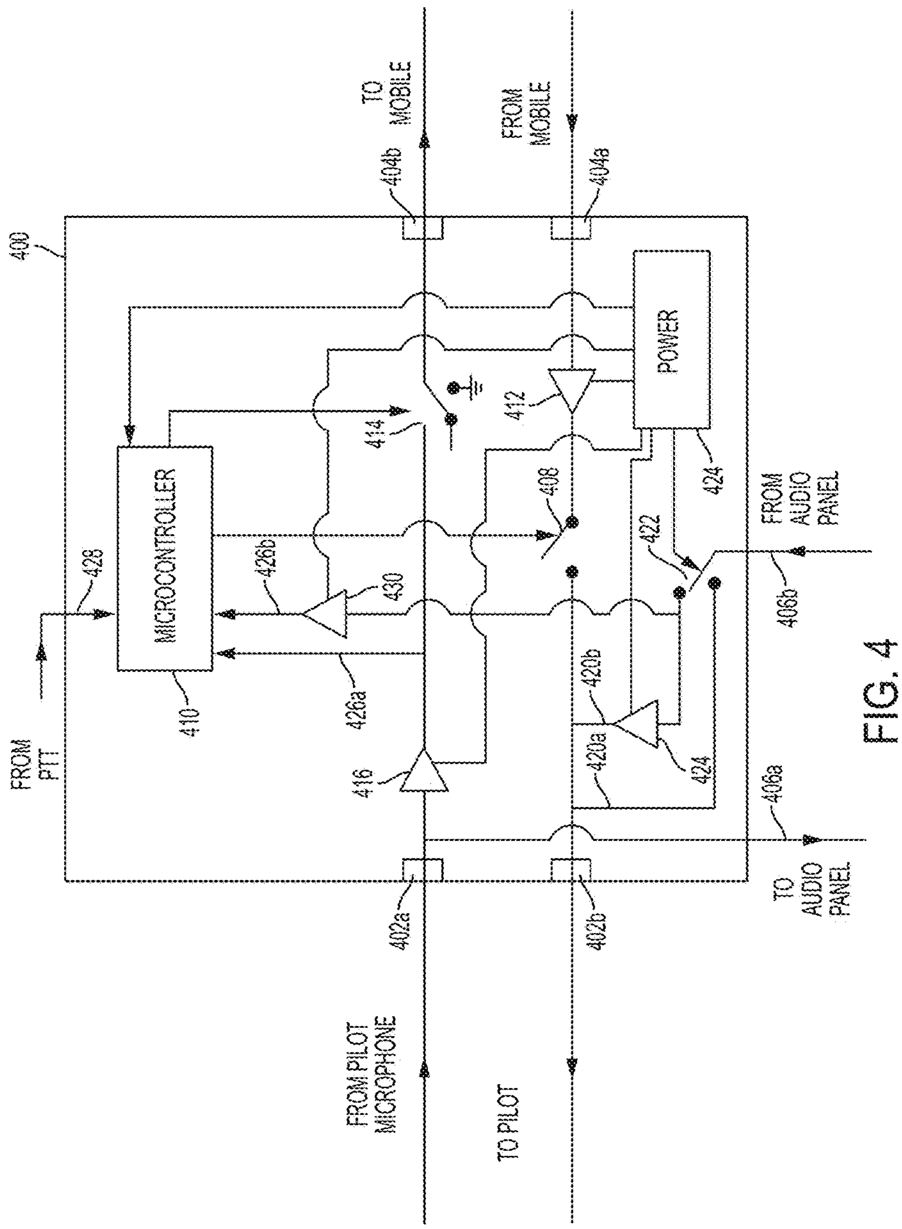
FIG. 4 illustrates an exemplary implementation of an interface device according to examples of the disclosure.

FIG. 4 illustrates an exemplary implementation of an interface device according to examples of the disclosure. In the example of FIG. 4, an interface device 400 can include pilot headset audio interfaces 402*a* and 402*b*. In the example of FIG. 4, interface 402*a* can receive audio signals from the pilot's microphone (not pictured) while interface 402*b* can output signals from the interface device 400 to the pilots audio headset (also not pictured). While in the example of FIG. 4, headset audio interfaces 402*a* and 402*b* are shown as two separate signals, the example should not be seen as limiting as a person of skill in the art would appreciate that the headset interfaces 402*a* and 402*b* can be implemented as a single input/output interface.

Interface device 400 can also include mobile computing device audio interfaces 404*a* and 404*b*. In the example of FIG. 4, mobile computing device audio interface 404*a* can receive audio signals from a mobile computing device (not pictured) while mobile computing device audio interface 404*b* can transmit audio signals from the interface device 400 to the mobile computing device. While in the example of FIG. 4, mobile computing device audio interfaces 404*a* and 404*b* are shown as two separate signals, the example should not be seen as limiting, and as a person of skill in the art would appreciate that the mobile computing device interfaces 404*a* and 404*b* can be implemented as a single input/output interface.

The interface device 400 can also include audio panel interfaces 406*a* and 406*b*. In one or more examples, audio panel interface 406*a* can be configured to transmit signals from the pilots microphone via interface 402*a* and transmit them directly to the audio panel via interface 406*a* In one or more examples, audio panel interface 406*b* can receive signals from an aviation intercommunication system (not pictured) that is configured to receive from and transmit to air traffic controllers via a radio communication system (not pictured).

As discussed above, interface device 400 can provide a noise-isolated audio connection between a pilot's audio headset and a mobile computing device. In the implementation of interface device 400 as illustrated in FIG. 4, the interface device can provide an audio connection between mobile computing device interface 404*a* and the pilot headset audio interface 402*b*. The connection can thus allow for audio signals from the mobile computing device to be inputted via mobile computing device interface 404*a* to be transmitted to the pilot's audio headset via interface 402*b*.

The audio connection between interface 404*a* and interface 402*b* can also include a switch 408 that can be configured to connect and disconnect the audio connection between interface 404*a* and interface 402*b*. The switch 408 can be controlled to open and close by microcontroller 410 whose operation will be discussed further below. When switch 408 is open, the audio connection between interface 404*a* and interface 402*b* can be broken, meaning that signals inputted at interface 404*a* will not be transmitted to interface 402*b*. When switch 408 is closed, signals coming from the mobile computing device via interface 404*a* can be transmitted to the pilot's audio headset via interface 402*b*.

The connection between interface 404*a* and interface 402*b* can also include a buffer 412. Buffer 412 can be configured to prevent or minimize changes to the impedance of the audio connection between the pilot's headset and the mobile computing device so that the power of the signal transmitted on the connection can be stable and not fluctuate. The buffer can protect the connection, by shielding the direct line between the pilot's headset and the mobile computing device's audio by implementing an amplification to the signal from the mobile computing device to the pilot's audio headset. In one or more examples, buffer 412 can be implemented with an operational amplifier with a unity gain. Additionally, in one or more examples, rather than unity gain, the operational amplifier can be implemented with a higher gain and fed through a potentiometer that can allow the pilot to control the volume mix of the mobile device into the headset. This feature can allow the pilot the ability to balance the sound levels from the different sources.

In the implementation of interface device 400 as illustrated in FIG. 4, the interface device 400 can also provide an audio connection between mobile computing device interface 404*b* and the pilot's microphone audio interface 402*a*. The connection can thus allow for audio signals from the pilot's microphone to be inputted via interface 402*a* to be transmitted to the mobile computing device via interface 404*b*.

The audio connection between interface 402*a* and interface 404*b* can also include a switch 414 that can be configured to connect and disconnect the audio connection between interface 402*a* and interface 404*b*. The switch 414 can be controlled to open and close by microcontroller 410 whose operation will be discussed further below. When switch 414 is open, the audio connection between interface 402*a* and interface 404*b* can be broken, meaning that signals inputted at interface 402*a* will not be transmitted to interface 404*b*. When switch 414 is closed, signals coming from the pilot's microphone via interface 402*a* can be transmitted to the mobile device via interface 404*b*.

The connection between interface 402*a* and interface 404*b* can also include a buffer 416. Buffer 416 can be configured to prevent or minimize changes to the impedance of the audio connection between the pilot's microphone and the aircraft audio panel so that the power of the signal transmitted on the connection can be stable and not fluctuate. The buffer can protect the connection, by shielding the direct line between the pilot's microphone and the aircraft panel audio input by implementing an amplification of the signal from the pilot's microphone to the mobile device. In one or more examples, buffer 416 can be implemented with an operational amplifier with a unity gain.

In the implementation of interface device 400 as illustrated in FIG. 4, the interface device can also provide an audio connection between audio panel interface 406*b* and the pilot's headset interface 402*b*. The connection can thus allow for audio signals from the audio panel, which in one or more examples can include radio transmissions from air traffic control, to be inputted via interface 406*b* and to be transmitted to the pilot's audio headset via interface 402*b*. In the example of FIG. 4, interface device 400 can include two separate audio connections 420*a* and 420*b* between interface 406*b* and interface 402*b*. Path 420*a* can be implemented as a direct path between interface 406*b* and interface 402*b*, whereas the path 420*b* can include a buffer 424 (described below)

The audio connection between interface 402*b* and interface 406*b* can also include a switch 422 that can be configured to switch the audio connection between interface 406*b* and 402*b* between path 420*a* and path 420*b*. As will be discussed in further detail below, the interface device 400 can include a power source 424 that can provide power to all of the active components contained within interface device 400. Switch 422 can be configured such that in the event that power source 424 fails, the switch can automatically be moved into a position such that interface 406*b* is connected to interface 402*b* via path 420*a*. In this way, in the event that there is a power failure in interface device 400, a functioning audio connection between the pilot and air traffic control can still be established. In one or more examples, the switch 422 can be implement by a solid-state relay that when powered connects interfaces 406*b* and 402*b* via path 420*b*, and when it is not powered, connects interface 406*b* and 402*b* via path 420*a*.

The audio connection through path 420*b* between interface 402*b* and interface 406*b* can also include a buffer 424. Buffer 424 can be configured to prevent or minimize changes to the impedance of the audio connection between the audio panel and the pilot's headset so that the power of the signal transmitted on the connection can be stable and not fluctuate. The buffer can protect the connection, by shielding the direct line between the pilot's headset and the audio panel by implementing an amplification to the signal from the audio panel to the pilot's audio headset. Buffer 416 can work together with buffer 412 to create a signal mixing point between the audio panel at 406*b* and the mobile device at 404*a*. In effect buffers 416 and 412 can keep the two outputs from interfering with each other thus allowing their respective signals to mix without affecting the original signal sources. In one or more examples, buffer 416 can be implemented with an operational amplifier with a unity gain or with a higher gain fed through a potentiometer as described above.

Returning back to the microcontroller 410, and as briefly described above, microcontroller 410 can be configured to control switches 414 and 408 via outputs to those switches from the microcontroller. Microcontroller 410 can also include two inputs 426*a* and 426*b* which are configured to receive audio from various components connected to the interface 400 (as described further below).

Input 426*a*, can receive the audio signal that is being transmitted from the pilot's microphone. In the example of FIG. 4, input 426*a* taps the pilot microphone signal inputted at interface 402*a* prior to the switch 414. Therefore, the microcontroller 410 can continuously receive any audio transmissions from the pilot's microphone regardless of whether switch 414 is on or off.

Input 426*b*, can receive the audio signal that is being transmitted from the audio panel to the pilot's headset. As illustrated in the example of FIG. 4, input 426*b* can be taken from path 420*b* prior to the buffer 424. In one or more examples of the disclosure, the input 426*b* can be buffered by buffer 430 so as to provide the appropriate shielding of the source signal.

When a pilot utilizes the microphone on their headset, as discussed above, the signal can be inputted at input interface 402*a* and routed to the audio panel via the output interface 406*a*. Thus, in one or more examples, the input signal from the audio panel received at input interface 406*b* can include not only signals from air traffic control, but can also include signals from the pilot's microphone. Thus, microcontroller 410 can receive a mixture of air traffic control signals and pilot audio at the input 426*b*. However, if the microcontroller is to use input 426*b* to determine whether or not air traffic control is talking, then the microcontroller may need to discern whether a signal received at the input is from the pilot's audio, air traffic control signals, or a mixture of both.

In one or more examples, the microcontroller can utilize the signal on input 426*a* to determine if a signal present 426*b* is coming from the pilot, air traffic control, or both. As discussed above input 426*a* can receive signals from the pilot's microphone via input interface 402*a*. If input 426*b* can include a mixture of the pilot's audio and air traffic control signals, then by subtracting the signal on input 426*a* from the input 426*b* (also accounting for latency between the signals), then it can be determined where the signal on input 426*b* came from. For example, if the subtraction comes out to be substantially zero, then the microcontroller can determine that the signal present on input 426*b* represents the pilot's audio signal only. However, if after the subtraction, a signal remains, then microcontroller 410 can ascertain that the signal of input 426*b* is from air traffic control. In one or more examples, the subtraction described above can be implemented by the microcontroller 410 utilizing inputs 426*a* and 426*b*. Alternatively, in one or more examples, the subtraction can be implemented via analog circuit elements external to the microcontroller 410, with the result of the subtraction being input at 426*b*.

In one or more examples, microcontroller 410 can also receive an additional input 428 that is configured to receive a signal from a pilot's push-to-talk switch. As described above, a pilot can communicate via the microphone on their headset with additional passengers within the aircraft and air traffic controllers via an aviation intercommunication system. However, when the pilot is using their microphone to communicate with other passengers, they may not desire to have those conversations also transmitted to air traffic controllers. Thus, the pilot can utilize a push-to-talk switch to ensure that the audio signals being delivered via their microphone are only reaching their intended audience. For instance, the pilot can push the push-to-talk switch and in response, the aviation intercommunication system can transmit the audio signal to air traffic control. If the pilot desires to speak to the other passengers in the flight and does not want that conversation to be broadcast to air traffic control, the pilot can simply cease to push the push-to-talk switch which can signal to the aviation intercommunication system to only transmit the pilot's audio signal to the other passengers and not air traffic control.

In one or more examples, microcontroller 410 can take as inputs an audio signal from the pilot's microphone at input 426*a*, an audio signal from the audio panel at input 426*b*, and a signal from the pilot's push-to-talk switch at input 428. The microcontroller can utilize those inputs signals to control switches 414 and 408 as will be described in detail further below.

Switch 414, as discussed above, can connect and disconnect the pilot's microphone with the mobile computing device. In one or more examples, it may be inefficient and power hungry to require the mobile computing device to constantly be listening for a pilot's audio commands because for a majority of the flight the pilot may not be speaking into the microphone. In other words, having the mobile computing device constantly scanning for signals from the pilot may require significant computing resources and power, such that it may be more efficient for the mobile computing device to only be listening to the audio signal connection from the pilot's microphone when there is a significant probability that the pilot is speaking through the microphone.

Microcontroller 410 can be configured to connect the mobile computing device via interface 404*b* with the pilot's microphone audio signal (received from interface 402*a*) when the microcontroller detects that the pilot is talking. The microcontroller 410 can utilize input interface 426*a* and analyze the received signal on the input interface to determine what position to put switch 414 into. Furthermore, in one or more examples described further below, microcontroller 410 can utilize switch 414 to provide a signal to the mobile computing device (via interface 404*b*).

In one or more examples of the disclosure, the switches described above (i.e., switches 408, 414, and 422) can include three operational states: On, Floating, and Grounded. In one or more examples, when the switch is in the on state, the switch can electrically connect the circuit components on each end of the switch. In one or more examples, when the switch is in the floating state, the switch can electrically disconnect (i.e., break the circuit) the circuit components on either end of the switch. In one or more examples, when the switch is in the grounded state, the switch can connect one end of the switch with a ground reference. As discussed below, the grounded state can be utilized to implement a messaging protocol between the audio interface device 400 and the mobile computing device.

Figure 5:
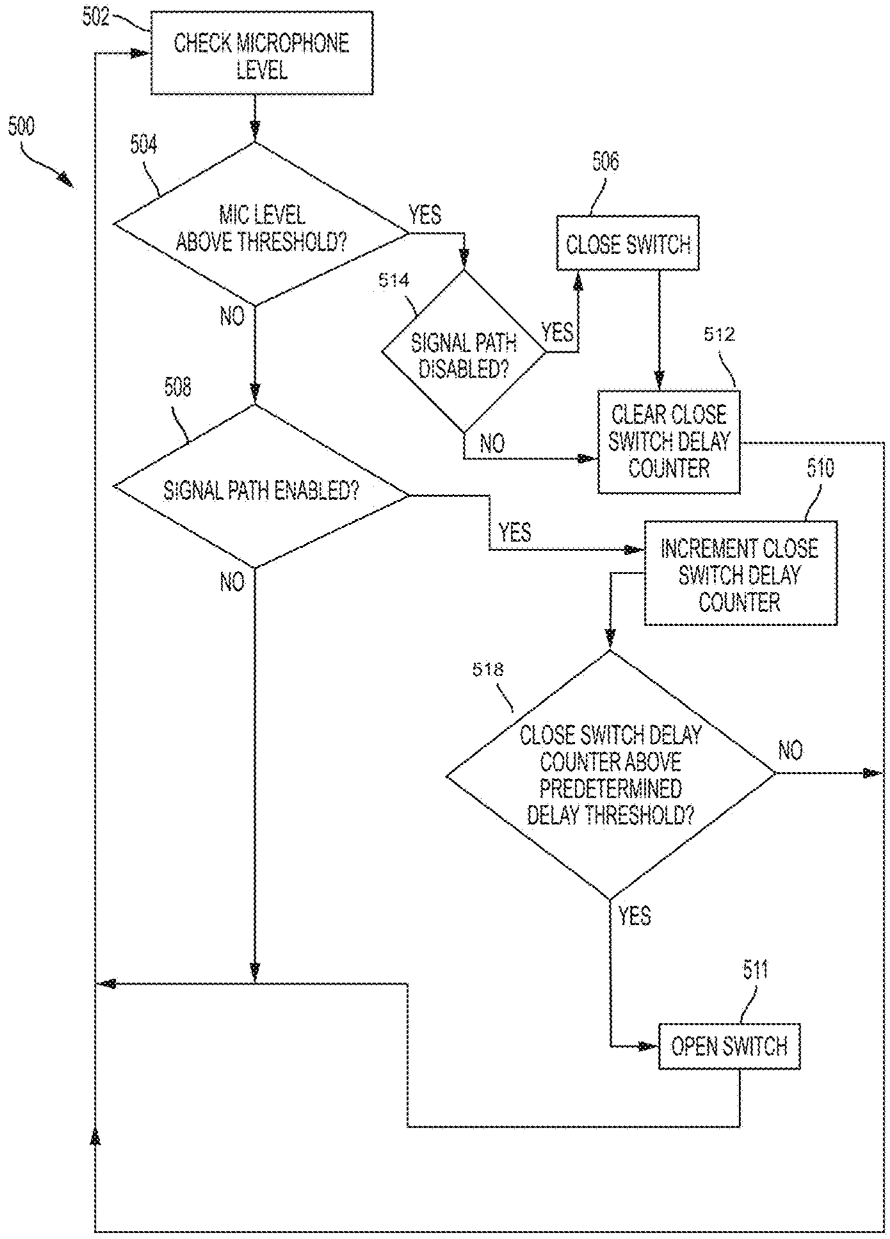
FIG. 5 illustrates an exemplary method for controlling a connection between a pilot's microphone and a mobile computing device according to examples of the disclosure.

FIG. 5 illustrates an exemplary method for controlling a connection between a pilot's microphone and a mobile computing device according to examples of the disclosure. In the example of FIG. 5, the method 500 can be implemented in a microcontroller such as microcontroller 410 of FIG. 4, and thus the description of the method will refer back to FIG. 4 to show examples of the operation of the method.

The method 500 can begin at step 502 wherein the microcontroller 410 can check the microphone signal level via input 426*a*. In one or more examples, "checking the microphone signal level" can include determining the power of the signal on input 426*a*. Once the level is determined at step 502, the method 500 can move to step 504, wherein the determined level can be compared against a predetermined threshold level and the status of the signal path can also be determined. At step 504, the level determined at step 502 can be compared against a predetermined threshold value. The predetermined threshold value can represent a value in which if the signal power level is above that level, there is a significant confidence that the signal contains an active audio signal (i.e., a voice transmission from the pilot's microphone).

If the level determined at step 502 is above the predetermined threshold at step 504, the process can move to step 514 wherein a determination is made as to whether the signal path between the pilot's microphone and the mobile computing device is disabled. If the signal path is disabled, then the process can move to step 506 wherein the switch 414 can be closed so as to enable the signal path between the pilot's microphone and the mobile computing device. In this way, at the moment when the pilot begins to transmit audio, the device 400 can ensure that the mobile computing device is listening, in case the pilot is issuing command to the mobile computing device. Once the switch is closed at step 506, the process can move to step 512 wherein a close switch delay counter is cleared. The operation and purpose of the close switch delay counter will be described in detail below. If it is determined at step 514 that the signal path is not disabled (i.e., it is enabled), the process can move to step 512 wherein the close switch delay counter is cleared. After the close switch delay counter is cleared at step 512, the process can revert back to the beginning and restart at step 502, wherein the microphone level is checked as described above.

Referring back to step 504, if the microphone level is determined to be below the threshold, the method can move to step 508, wherein a determination is made as to whether the signal path between the pilot's microphone and the mobile computing device is enabled. If at step 508 it is determined that the signal path is enabled, then the process can move to step 510 wherein the close switch delay counter is incremented. The close switch delay counter can be a counter that is configured to count the amount of time that has passed between when the pilot's microphone signal has been below the predetermined threshold and the signal path between the pilot's microphone and the mobile computing device has been enabled. In this way, once the pilot has been silent for a predetermined amount of time, the mobile computing device can stop listening to the pilot's microphone thereby preserving computing and battery resources of the mobile computing device. In the event that it is determined that the signal path is not enabled at step 508, the process can begin again starting at step 502 as indicated in FIG. 5.

Referring back to step 510, once the pilot's microphone level has been determined to be below a predetermined threshold at step 504 and the signal path between the pilot's microphone and the mobile computing device has been determined to be enabled at step 508, the close switch delay counter can be incremented to record a unit of time has elapsed between the moment the pilot stopped communicating from their microphone and the signal path remaining enabled.

Once the counter has been incremented at step 510, the process can move to step 518 wherein a determination is made as to whether the close switch delay counter is above a predetermined threshold. As described above, the close switch delay counter records the amount of time between when the pilot's microphone level has gone below a predetermined threshold and the signal path remains enabled. Thus at step 518, a check is made to see if the amount of time that has elapsed as recorded by the close switch delay counter is above a predetermined threshold. If it is above the predetermined threshold, then the process can move to step 511 wherein the switch that connects the pilot's microphone and the mobile computing device is opened. After the switch is opened at step 511, the process can revert back to the beginning of the method beginning with step 502.

Referring aback to step 518, if the close switch delay counter is below the predetermined threshold then the process can revert back to step 502 wherein the pilot's microphone level is checked.

The process described above with respect to FIG. 5, can be further illustrated by the pseudocode example provided below:

```
If [mic level ABOVE threshold]
  If [Switch is OPEN]
    Switch=close
    cutoff_delay_timer=0
  Else
    Cutoff_delay_timer=0;
  End If
Else if [mic level is BELOW threshold AND Switch is
  CLOSED]
  Cutoff_delay_timer=Cutoff_delay_timer+delta_time
  If [Cutoff_delay_timer>1000 ms]
    Switch=open
  End If
End If
```

The method of FIG. 5 can thus present an exemplary way for the switch 414, which connects the pilot's microphone to the mobile computing device, to be controlled so as to ensure that the mobile computing device is listening to the pilot's audio signal when necessary. In this way, the amount of power and computing resources required to have the mobile computing device analyze signals coming from interface 404*b* can be minimized. Furthermore, for the purpose of recognizing commands from audio inputs, the mobile computing device, using the method described with respect to FIG. 5 can have a higher probability of properly recognizing those commands if it can tell when a segment of speech starts and ends.

The switch 414 can also be used to provide a signal to the mobile computing device that, for example, the pilot is about to talk. Mobile computing devices can often be configured to recognize the grounding state of a signal that it is connected to. For instance, if the grounding state of the line that is connected to the mobile computing device is toggled on and off in a distinct pattern, the mobile computing device can perform a function in response to the detection of the pattern. Toggling a line can refer to grounding and ungrounding the line. If switch 414 were left in a floating state, then the mobile computing device may still see a bias voltage on the line which can be caused by the internal electronics of the mobile computing device. However, if switch 414 is put into the grounded state, the bias voltage from the internal electronics can have a path to ground. Thus, by toggling the switch 414 from a ground to ungrounded state, the mobile computing device can tell the difference by monitoring the voltage on the input to the device coming from output interface 404*b*. In one or more examples, the shape of the signal used to signal the mobile computing device can be determined by firmware running within microcontroller 410, while the interpretation of those signals can be handled by the operating system and other software of the mobile computing device.

Within the context of FIG. 4, the line (i.e., signal path) from the pilot's microphone to the mobile computing device that goes through interface 404*b* can be toggled by opening (i.e., operating the switch in the grounded state) and closing switch 414 repeatedly. Thus, as an example, if the microcontroller 410 wants to signal the mobile computing device to begin listening for audio from the pilot, the microcontroller 410 can toggle switch 410 a predetermined number of times. The mobile computing device can recognize the pattern of toggling created by the microcontroller and begin listening to the line for the pilot's audio signal. The microcontroller 410 can also toggle the line to alert the mobile computing device to when it can cease to listen to the line. In this way, the mobile computing device, by knowing when to begin listening and when to cease listening, for example, can preserve computing resources and power by not expending those resources at times when the pilot is not talking via the microphone.

Figure 6:
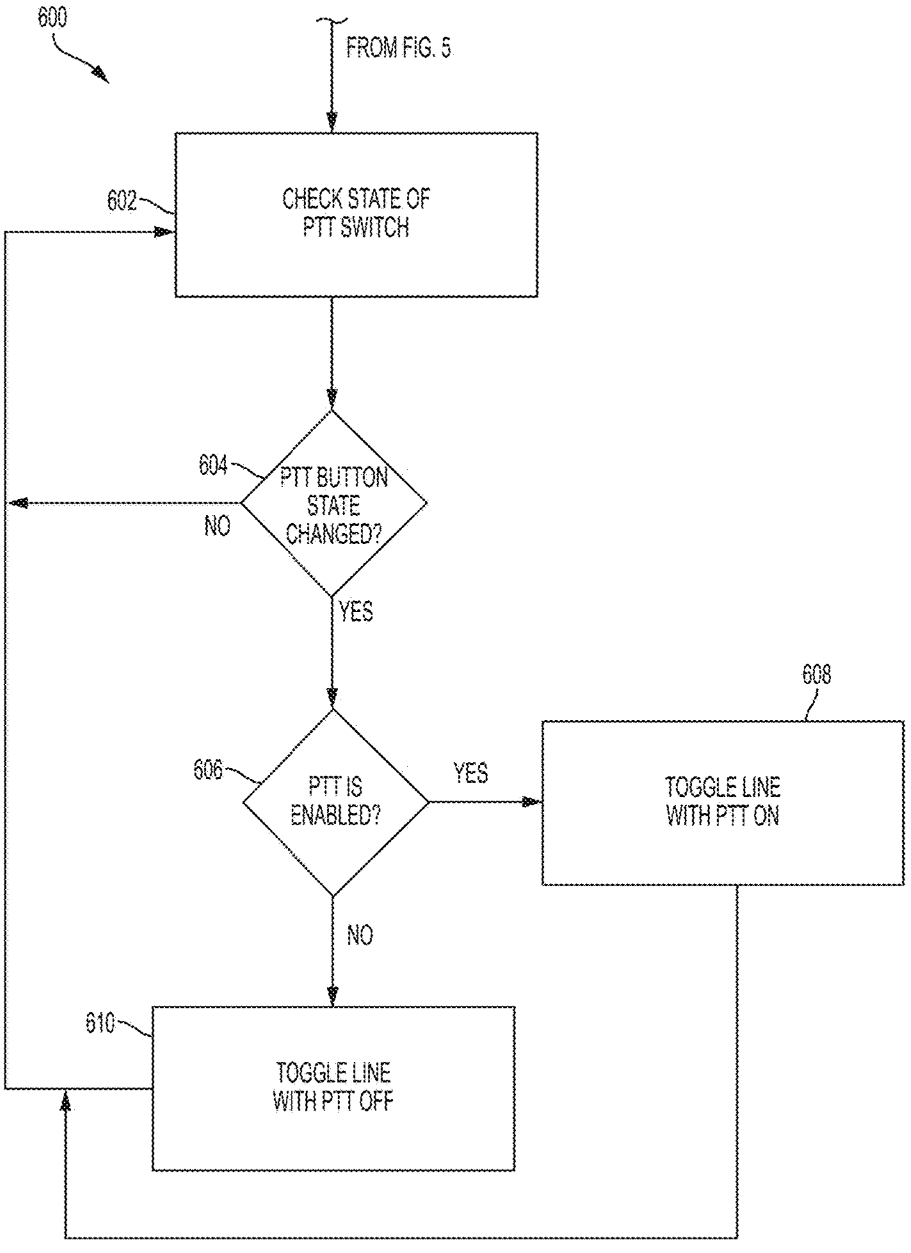
FIG. 6 illustrates an exemplary method to alert a mobile computing device to listen for an audio signal according to examples of the disclosure.

Returning to the example of FIG. 5, at step 518 if the close switch delay counter is above the predetermined threshold so that at step 511 the switch between the pilot's microphone and the mobile computing device is opened, then the process can move to process 600 of FIG. 6. FIG. 6 illustrates an exemplary method to alert a mobile computing device to listen for an audio signal according to examples of the disclosure. The method 600 of FIG. 6 can begin where FIG. 5 ended, with a determination that microphone signal power (determined at step 502) has been below the predetermined threshold for longer than the predetermined time and that the signal path is disabled. When these two conditions are true it can mean that the audio connection between the pilot's microphone signal and the mobile computing device has been disabled because switch 414 is open. Once the line has been determined to be in this state, the interface device 400 can monitor that status of the push-to-talk (PTT) switch, and transmit signals to the mobile computing device letting it know when the status of the PTT switch has changed, and what that new status is. Thus, at step 602, the method 600 can check the state of the PTT switch (i.e., check whether the PTT switch is enabled or disabled).

Once the state of the PTT switch has been determined at step 602, the process can move to step 604, wherein it is determined whether the PTT button state has changed from a previous state. At step 604, the newly determined state of the button determined at step 602 can be compared against a previous state to determine if the state of the PTT switch has been changed. If it is determined that no change has occurred, then the method 600 can move back to step 602 and check the state of the PTT again. This process can continue in a loop until finally a change in the PTT button state has occurred.

Once it has been determined that the PTT button has been changed, the method 600 can move to step 606 wherein a determination is made as to whether the PTT has been enabled (i.e, the pilot has engaged the PTT switch). If it is determined at step 606 that the PTT has been enabled, then the method 600 can move to step 608 wherein the microcontroller 410 can send a signal to the mobile computing device alerting it to the fact that the PTT has been enabled. Then execution control can return so that other aspects of the firmware can continue to execute. Upon alerting the mobile computing device at step 608, the process can then revert back to the beginning of the process at step 602.

The microcontroller 410 can signal the mobile computing device that the PTT has been enabled by toggling the signal line using switch 414 using a predefined pattern that the mobile computing device has been configured to understand is the signal for indicating that the PTT has been enabled. The PTT line can be toggled on and off as described above in the discussion of toggling described with respect to FIG. 4.

If at step 606 it is determined that the PTT has been disabled, then the method can move to step 610 wherein the microcontroller 410 can send a signal to the mobile computing device alerting it to the fact that the PTT has been disabled. Once the signal has been sent at step 610, the process can return back to the back to the beginning of the process at step 602.

The microcontroller 410 can signal the mobile computing device that the PTT has been disabled by toggling the signal line using switch 414 using a predefined pattern that the mobile computing device has been configured to understand is the signal for indicating that the PTT has been disabled. The PTT line can be toggled on and off as described above in the discussion of toggling described with respect to FIG. 4.

In this way, the mobile computing device can be aware of whether an audio signal generated by the pilot using their microphone is meant for air traffic control, or if the signal could be a command to the mobile computing device to perform an action or task.

Figure 7:
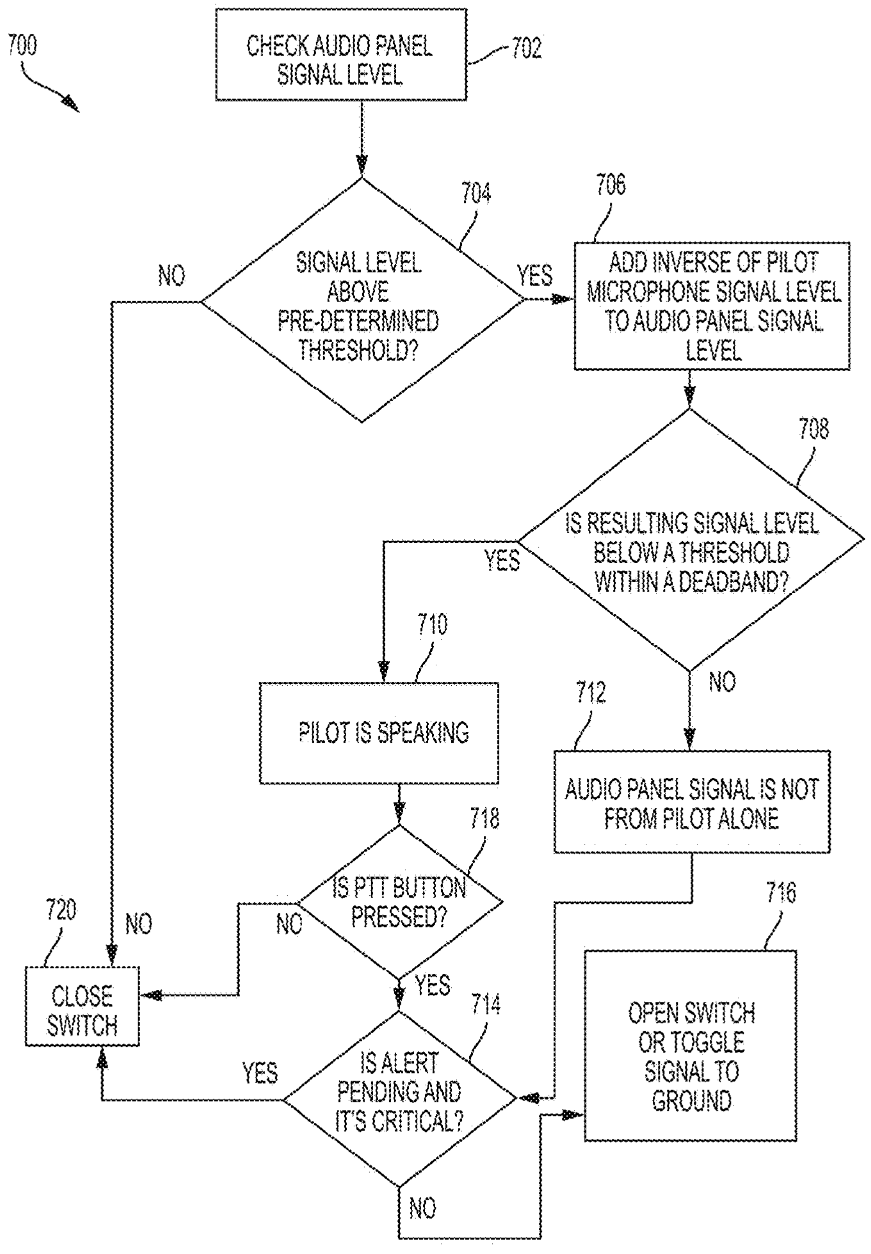
FIG. 7 illustrates an exemplary method for controlling a connection between a mobile computing device's audio output and a pilot's audio headset according to examples of the disclosure.

Returning to the example of FIG. 4, and as discussed above, the microcontroller 410 can control switch 408 to enable or disable the signal path that transmits audio signals from the mobile computing device to the pilot's headset. FIG. 7 illustrates an exemplary method for controlling a connection between a mobile computing device's audio output and a pilot's audio headset according to examples of the disclosure. The method 700 can begin at step 702 wherein the signal level of the signal coming from the audio panel can be determined. Referring to the example of FIG. 4, the microcontroller 410 can check the signal level using the input signal 426*b* which is taken from interface 406*b* that receives the signal from the audio panel of the aviation intercommunication device.

Once the signal level is determined at step 702, the method 700 can move to step 704 wherein the signal level is compared to a predetermined threshold. Since a high-signal strength coming from the aviation intercommunication system can be indicative of a radio transmission from air traffic control and/or a pilot, the predetermined threshold can be set to a level that if exceeded means that there is a significant probability that a radio transmission is being received. Thus, at step 704, if it is determined that the signal level is below the predetermined threshold, that can be indicative of a lack of transmissions on the audio panel, meaning the pilot is free to receive audio notifications from the mobile computing device, and therefore the process can move to step 720 wherein switch 408 is closed thus allowing the mobile computing device to transmit audio notifications to the pilot.

If it is determined that the signal level determined at step 702 is above the predetermined threshold, the method 700 can move to step 706 wherein the pilot's microphone signal can be subtracted from the audio signal received at the audio panel. By subtracting the pilot's microphone signal from the audio panel signal, a determination can be made as to whether the audio panel signal is from the pilot's microphone only or includes audio transmissions from air traffic control. If the signal on the audio panel included only transmissions from the pilot's microphone, then subtracting the pilot's microphone signal from the audio panel signal (accounting for latencies in the signal) should result in a near zero signal. Thus, after subtracting the pilot's microphone signal at step 706, the process can move to step 708 wherein the resultant signal can be compared a predetermined threshold indicative of a "deadband" (i.e., substantially no signal). If at step 708, it is determined that the signal is above the predetermined threshold, the process can move to step 712 wherein a determination is made that the pilot is not the only party whose signal is being relayed by the audio panel. Once it is determined that other parties than the pilot are talking, the method can move to step 714 which is described in detail below.

If at step 708, it is determined that the signal is below the predetermined threshold, then the process can move to step 710 wherein a determination is made that the pilot is speaking on their microphone. If a determination is made at step 710 that the pilot is speaking, then the process can move to step 718 wherein a determination can be made as to whether the push-to-talk switch (described above) is being pressed by the pilot. As discussed above, if the pilot is pushing on the push to talk switch that can be indicative of the pilot's desire to broadcast a transmission from their microphone. In the event that the pilot is about to talk, the mobile computing device may want to refrain from issuing any audio notifications so as to not disturb the pilot when they are in communication. Thus at step 718, if it determined that the push-to-talk switch is not being pressed, the process can move to step 720, wherein switch 408 is closed thereby allowing the mobile computing device to issue audio notifications to the pilot.

If it is determined that the push-to-talk switch is being pressed, then the process can move to step 714 wherein a determination can be made as to whether the mobile computing device has any audio notifications that are pending and are critical. A critical audio notification can include notifications that are intended to make the pilot aware of a situation that needs immediate attention. For instance, critical audio notifications can include things such as impending collisions with other aircraft or notifications regarding flight path deviations as examples. In the event that an alert is deemed critical, even if the pilot is talking on his microphone, the mobile computing device may want to interrupt the pilot to issue the critical audio notification. Thus at step 714, if the mobile computing device determines that it has a critical audio notification pending, the process can move to step 720, wherein the switch 408 that connects the output audio from the mobile computing device with the pilot's headset is closed thereby permitting the mobile computing device to issue the audio notification over the line. However, if at step 714 it is determined that there are no pending critical audio notifications, the process can move to step 716 wherein the switch 408 is opened (or left opened, if the switch was already opened) so as to prevent the mobile computing device from interrupting the pilot with an audio notification.

Returning to the example of FIG. 4, and as briefly discussed above, the interface device can include a power source 424. The power source 424 can provide power to each of the buffers 412, 416, and 424, each of the switches 408, 414, and 422, and to the microcontroller 410. In one or more examples, the power source 424 can be implemented using a battery. In one example, the battery can be implemented using a lithium polymer battery. In one or more examples, the battery can be rechargeable. In one or more examples, the battery can be recharged using a USB power charger. In another example or additionally, the battery can be recharged using a solar cell charger.

The power source 424 can also include a power regulator that can be configured to ensure that each component that derives its power from the power source can receive the proper voltage and current. The power regulator can ensure that no component in the interface device 400 receives too much power so as to burn out the component rendering the component unsatisfactory to perform its intended task. In one or more examples, the power source 424 can utilize a 5 volt battery and a 3.3 volt power regulator, but the disclosure should not be seen as limiting, and the battery and the power regulator can be of sufficient power to perform its intended task.

Figure 8:
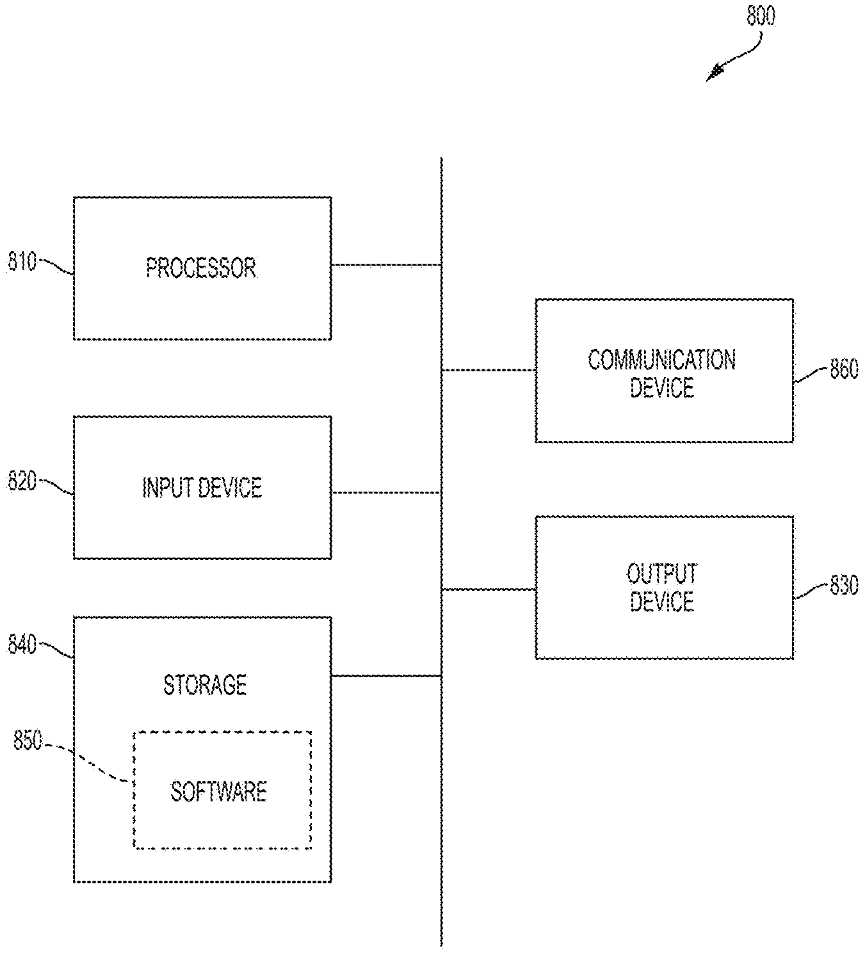
FIG. 8 illustrates an example of a computing device in accordance with one embodiment.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed to An interface device, the device comprising: a first input configured to receive audio signals from a microphone, a first output configured to output audio signals to an audio headset, a second input configured to receive audio signals from a mobile computing device, a second output configured to output audio signals to the mobile computing device, a third input configured to receive audio signals from an aircraft audio panel, a third output configured to send audio signals to the aircraft audio panel, a push-to-talk switch that when engaged is configured to transmit audio signals from the microphone to air traffic controllers, and a microcontroller configured to generate a first signal path between the first input and the second output when it is determined that the microphone is receiving a signal, and generate a second signal path between the second input and the first output when it is determined that a signal level on the third input is below a predetermined threshold. Additionally or alternatively to one or more examples disclosed above generating the first signal path comprises: determining a signal level present on the first input, determining if the signal level is above a predetermined threshold, determining if first signal path between the first input and the second output is disabled, and closing a switch located on the first signal path if it is determined that the signal level is above the predetermined threshold and the first signal path is disabled. Additionally or alternatively to one or more examples disclosed above if the microcontroller determines if the signal level is below the predetermined threshold, the microcontroller further: determines if the first signal path is enabled; determines if the signal level has been below the predetermined threshold longer than a predetermined amount of time; and opens the switch located on the first signal path, if it is determined that the signal level has been below the predetermined threshold longer than the predetermined amount of time and the first signal path is enabled. Additionally or alternatively to one or more examples disclosed above the first signal path includes a buffer. Additionally or alternatively to one or more examples disclosed above the microcontroller generates the second signal path between the second input and the first output by: closing a switch located on the second signal path when it is determined that the signal level on the third input is below a predetermined threshold. Additionally or alternatively to one or more examples disclosed above the microcontroller opens the switch located on the second signal path if it is determined that the signal level on the third input is above the predetermined threshold. Additionally or alternatively to one or more examples disclosed above the second signal path includes a buffer. Additionally or alternatively to one or more examples disclosed above the microcontroller provides a signal to the second output when it is determined that the push-to-talk switch has been engaged by opening and closing a switch located on a signal path between the first input and the second output in a predetermined pattern. Additionally or alternatively to one or more examples disclosed above the microcontroller further provides a signal to the second output when it is determined that the push-to-talk switch has been engaged. Additionally or alternatively to one or more examples disclosed above he microcontroller provides a signal to the second output when it is determined that the push-to-talk switch has been disengaged, wherein the signal is generated by opening and closing a switch located along the first signal path in a predetermined pattern. Additionally or alternatively to one or more examples disclosed above the device further includes a power source configured to provide a predetermined amount of power to the microcontroller. Additionally or alternatively to one or more examples disclosed above a signal path between the third input and the first output is automatically created if it is determined that the power source is providing power to the microcontroller that is above the predetermined amount of power.

Other examples of the disclosure are directed to A method for operating an interface device, wherein the electronic device includes a first input configured to receive audio signals from a microphone, a first output configured to output audio signals to an audio headset, a second input configured to receive audio signals from a mobile computing device, a second output configured to output audio signals to the mobile computing device, a third input configured to receive audio signals from an aircraft audio panel, a third output configured to send audio signals to the aircraft audio panel, and a push-to-talk switch that when engaged is configured to transmit audio signals from the microphone to air traffic controllers, the method comprising: generate a first signal path between the first input and the second output when it is determined that the microphone is receiving a signal, and generate a second signal path between the second input and the first output when it is determined that a signal level on the third input is below a predetermined threshold. Additionally or alternatively to one or more examples disclosed above generating the first signal path comprises: determining a signal level present on the first input, determining if the signal level is above a predetermined threshold, determining if first signal path between the first input and the second output is disabled, and closing a switch located on the first signal path if it is determined that the signal level is above the predetermined threshold and the first signal path is disabled. Additionally or alternatively to one or more examples disclosed above if it is determined that the signal level is below the predetermined threshold, the method further: determines if the first signal path is enabled, determines if the signal level has been below the predetermined threshold longer than a predetermined amount of time, and opens the switch located on the first signal path, if it is determined that the signal level has been below the predetermined threshold longer than the predetermined amount of time and the first signal path is enabled. Additionally or alternatively to one or more examples disclosed above the first signal path includes a buffer. Additionally or alternatively to one or more examples disclosed above generating the second signal path between the second input and the first output includes: closing a switch located on the second signal path when it is determined that the signal level on the third input is below a predetermined threshold. Additionally or alternatively to one or more examples disclosed above the method further comprising opening the switch located on the second signal path if it is determined that the signal level on the third input is above the predetermined threshold. Additionally or alternatively to one or more examples disclosed above the second signal path includes a buffer. Additionally or alternatively to one or more examples disclosed above the method further comprises providing a signal to the second output when it is determined that the push-to-talk switch has been engaged by opening and closing a switch located on a signal path between the first input and the second output in a predetermined pattern. Additionally or alternatively to one or more examples disclosed above the method further comprises providing a signal to the second output when it is determined that the push-to-talk switch has been engaged. Additionally or alternatively to one or more examples disclosed above the method further comprises providing a signal to the second output when it is determined that the push-to-talk switch has been disengaged, wherein the signal is generated by opening and closing a switch located along the first signal path in a predetermined pattern.

Other examples of the disclosure are directed to a computer readable storage medium storing one or more programs, the one or more programs comprising instructions, which when executed by an electronic device wherein the electronic device includes a first input configured to receive audio signals from a microphone, a first output configured to output audio signals to an audio headset, a second input configured to receive audio signals from a mobile computing device, a second output configured to output audio signals to the mobile computing device, a third input configured to receive audio signals from an aircraft audio panel, a third output configured to send audio signals to the aircraft audio panel, and a push-to-talk switch that when engaged is configured to transmit audio signals from the microphone to air traffic controllers, causes the device to: generate a first signal path between the first input and the second output when it is determined that the microphone is receiving a signal, and generate a second signal path between the second input and the first output when it is determined that a signal level on the third input is below a predetermined threshold. Additionally or alternatively to one or more examples disclosed above allowing a first signal to be transmitted between the first input interface and the second output comprises: determining a signal level present on the first input, determining if the signal level is above a predetermined threshold, determining if first signal path between the first input and the second output is disabled, and closing a switch located on the first signal path if it is determined that the signal level is above the predetermined threshold and the first signal path is disabled. Additionally or alternatively to one or more examples disclosed above if it is determined that the signal level is below the predetermined threshold, the electronic device is further caused to: determine if the first signal path is enabled, determine if the signal level has been below the predetermined threshold longer than a predetermined amount of time, and open the switch located on the first signal path, if it is determined that the signal level has been below the predetermined threshold longer than the predetermined amount of time and the first signal path is enabled. Additionally or alternatively to one or more examples disclosed above the first signal path includes a buffer. Additionally or alternatively to one or more examples disclosed above generating the second signal path between the second input and the first output includes: closing a switch located on the second signal path when it is determined that the signal level on the third input is below a predetermined threshold. Additionally or alternatively to one or more examples disclosed above the electronic device is further caused to open the switch located on the second signal path if it is determined that the signal level on the third input is above the predetermined threshold. Additionally or alternatively to one or more examples disclosed above the second signal path includes a buffer. Additionally or alternatively to one or more examples disclosed above the electronic device is further caused to provide a signal to the second output when it is determined that the push-to-talk switch has been engaged by opening and closing a switch located on a signal path between the first input and the second output in a predetermined pattern. Additionally or alternatively to one or more examples disclosed above the electronic device is further caused to provide a signal to the second output when it is determined that the push-to-talk switch has been engaged. Additionally or alternatively to one or more examples disclosed above the electronic device is further caused to provide a signal to the second output when it is determined that the push-to-talk switch has been disengaged by opening and closing a switch located on a signal path between the first input and the second output in a predetermined pattern.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. An interface device, the device comprising:
- a first input configured to receive audio signals from a microphone;
- a first output configured to output audio signals to an audio headset;
- a second input configured to receive audio signals from a mobile computing device;
- a second output configured to output audio signals to the mobile computing device;
- a third input configured to receive audio signals from an aircraft audio panel;
- a third output configured to send audio signals to the aircraft audio panel;
- a push-to-talk switch that when engaged is configured to transmit audio signals from the microphone to air traffic controllers; and
- a microcontroller configured to:
  - generate a first signal path between the first input and the second output when it is determined that the microphone is receiving a first signal, wherein the microcontroller provides a second signal to the second output when it is determined that the push-to-talk switch has been engaged by grounding and un-grounding a switch located on the first signal path between the first input and the second output in a predetermined pattern; and
  - generate a second signal path between the second input and the first output when it is determined that a signal level on the third input is below a predetermined threshold.

2. The interface device of claim 1, wherein generating the first signal path comprises:
- determining a signal level present on the first input;
- determining if the signal level is above a predetermined threshold;
- determining if first signal path between the first input and the second output is disabled; and
- closing a switch located on the first signal path if it is determined that the signal level is above the predetermined threshold and the first signal path is disabled.

3. The device of claim 2, wherein if the microcontroller determines if the signal level is below the predetermined threshold, the microcontroller further:
- determines if the first signal path is enabled;
- determines if the signal level has been below the predetermined threshold longer than a predetermined amount of time; and
- opens the switch located on the first signal path, if it is determined that the signal level has been below the predetermined threshold longer than the predetermined amount of time and the first signal path is enabled.

4. The device of claim 2, wherein the first signal path includes a buffer.

5. The device of claim 1, wherein the microcontroller generates the second signal path between the second input and the first output by:
- closing a switch located on the second signal path when it is determined that the signal level on the third input is below a predetermined threshold.

6. The device of claim 5, wherein the microcontroller opens the switch located on the second signal path if it is determined that the signal level on the third input is above the predetermined threshold.

7. The device of claim 5, wherein the second signal path includes a buffer.

8. The device of claim 1, wherein the microcontroller provides a third signal to the second output when it is determined that the push-to-talk switch has been disengaged by grounding and un-grounding a switch located along the first signal path in a predetermined pattern.

9. The device of claim 1, wherein the device further includes a power source configured to provide a predetermined amount of power to the microcontroller.

10. The device of claim 9, wherein a fourth signal path between the third input and the first output is automatically created if it is determined that the power source is providing power to the microcontroller that is above the predetermined amount of power.

11. A method for operating an interface device, wherein the electronic device includes a first input configured to receive audio signals from a microphone, a first output configured to output audio signals to an audio headset, a second input configured to receive audio signals from a mobile computing device, a second output configured to output audio signals to the mobile computing device, a third input configured to receive audio signals from an aircraft audio panel, a third output configured to send audio signals to the aircraft audio panel, and a push-to-talk switch that when engaged is configured to transmit audio signals from the microphone to air traffic controllers, the method comprising:

generating a first signal path between the first input and the second output when it is determined that the microphone is receiving a first signal, wherein the method further comprises providing a second signal to the second output when it is determined that the push-to-talk switch has been engaged by grounding and un-grounding a switch located on the first signal path between the first input and the second output in a predetermined pattern; and generating a second signal path between the second input and the first output when it is determined that a signal level on the third input is below a predetermined threshold.

12. The method of claim 11, wherein generating the first signal path comprises:

determining a signal level present on the first input;

determining if the signal level is above a predetermined threshold;

determining if first signal path between the first input and the second output is disabled; and closing a switch located on the first signal path if it is determined that the signal level is above the predetermined threshold and the first signal path is disabled.

13. The method of claim 12, wherein if it is determined that the signal level is below the predetermined threshold, the method further comprises:

determining if the first signal path is enabled;

determining if the signal level has been below the predetermined threshold longer than a predetermined amount of time; and opening the switch located on the first signal path, if it is determined that the signal level has been below the predetermined threshold longer than the predetermined amount of time and the first signal path is enabled.

14. The method of claim 12, wherein the first signal path includes a buffer.

15. The method of claim 11, wherein generating the second signal path between the second input and the first output includes:

closing a switch located on the second signal path when it is determined that the signal level on the third input is below a predetermined threshold.

16. The method of claim 15, the method further comprising opening the switch located on the second signal path if it is determined that the signal level on the third input is above the predetermined threshold.

17. The method of claim 15, wherein the second signal path includes a buffer.

18. The method of claim 11, wherein the method further comprises providing a third signal to the second output when it is determined that the push-to-talk switch has been disengaged by grounding and un-grounding a switch located along the first signal path in a predetermined pattern.

19. A computer readable storage medium storing one or more programs, the one or more programs comprising instructions, which when executed by an electronic device, wherein the electronic device includes a first input configured to receive audio signals from a microphone, a first output configured to output audio signals to an audio headset, a second input configured to receive audio signals from a mobile computing device, a second output configured to output audio signals to the mobile computing device, a third input configured to receive audio signals from an aircraft audio panel, a third output configured to send audio signals to the aircraft audio panel, and a push-to-talk switch that when engaged is configured to transmit audio signals from the microphone to air traffic controllers, causes the device to:

generate a first signal path between the first input and the second output when it is determined that the microphone is receiving a first signal, wherein the electronic device is further caused to provide a second signal to the second output when it is determined that the push-to-talk switch has been engaged by grounding and un-grounding a switch located on the first signal path between the first input and the second output in a predetermined pattern; and generate a second signal path between the second input and the first output when it is determined that a signal level on the third input is below a predetermined threshold.

20. The computer readable storage medium of claim 19, wherein allowing a first signal to be transmitted between the first input interface and the second output comprises:

determining a signal level present on the first input;

determining if the signal level is above a predetermined threshold;

determining if first signal path between the first input and the second output is disabled; and closing a switch located on the first signal path if it is determined that the signal level is above the predetermined threshold and the first signal path is disabled.

21. The computer readable storage medium of claim 20, wherein if it is determined that the signal level is below the predetermined threshold, the electronic device is further caused to:

determine if the first signal path is enabled;

determine if the signal level has been below the predetermined threshold longer than a predetermined amount of time; and open the switch located on the first signal path, if it is determined that the signal level has been below the predetermined threshold longer than the predetermined amount of time and the first signal path is enabled.

22. The computer readable storage medium of claim 20, wherein the first signal path includes a buffer.

23. The computer readable storage medium of claim 19, wherein generating the second signal path between the second input and the first output includes:

closing a switch located on the second signal path when it is determined that the signal level on the third input is below a predetermined threshold.

24. The computer readable storage medium of claim 23, wherein the electronic device is further caused to open the switch located on the second signal path if it is determined that the signal level on the third input is above the predetermined threshold.

25. The computer readable storage medium of claim 23, wherein the second signal path includes a buffer.

26. The computer readable storage medium of claim 19, wherein the electronic device is further caused to provide a third signal to the second output when it is determined that the push-to-talk switch has been disengaged by grounding and un-grounding a switch located on the first signal path between the first input and the second output in a predetermined pattern.

* * * * *